(12) United States Patent
Yamaguchi et al.

(10) Patent No.: US 8,233,184 B2
(45) Date of Patent: Jul. 31, 2012

(54) SYSTEM AND METHOD FOR DETERMINING PRINT LAYOUT OF IMAGES BASED ON PRINT MEDIUM BEING OF FIXED OR UNDEFINED LENGTH

(75) Inventors: Yoshinori Yamaguchi, Yamato (JP); Tadanobu Fujita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1061 days.

(21) Appl. No.: 11/671,148

(22) Filed: Feb. 5, 2007

(65) Prior Publication Data

US 2007/0188807 A1    Aug. 16, 2007

(30) Foreign Application Priority Data

Feb. 15, 2006 (JP) .................................. 2006-038480

(51) Int. Cl.
*G06K 1/00* (2006.01)
*G06K 15/00* (2006.01)
*G06F 3/12* (2006.01)
*G06F 17/00* (2006.01)
*H04N 1/387* (2006.01)
*H04N 1/46* (2006.01)

(52) U.S. Cl. ....... 358/1.18; 358/450; 358/452; 358/540; 358/1.13; 358/1.14; 358/1.15; 715/222; 715/223; 715/224; 715/225; 715/235; 715/246

(58) Field of Classification Search .................. None
See application file for complete search history.

(56) References Cited

U.S. PATENT DOCUMENTS

| | | | |
|---|---|---|---|
| 5,639,169 A | 6/1997 | Aruga | |
| 6,141,028 A | 10/2000 | Aruga | |
| 6,301,013 B1 | 10/2001 | Momose et al. | |
| 2002/0131086 A1* | 9/2002 | Mori et al. | 358/1.18 |
| 2006/0010100 A1 | 1/2006 | McAvoy et al. | |
| 2006/0061805 A1 | 3/2006 | Kawamura | |

FOREIGN PATENT DOCUMENTS

| | | |
|---|---|---|
| CN | 1752918 | 3/2006 |
| EP | 1 387 289 | 2/2004 |
| JP | 11-070718 | 3/1999 |
| JP | 11-314422 | 11/1999 |
| JP | 11314422 | * 11/1999 |

(Continued)

OTHER PUBLICATIONS

"Kobayashi Akihiko", "print control and controller", JP Pub Date Nov. 1999, JP Pub No. 11-314422.*
Kobayashi Akihiko; "Print Controller . . . Recording Medium"; JP Pub Date Nov. 1999; Machine Translation in English of JP Pub No. 11-314422.*

(Continued)

*Primary Examiner* — Benny Q Tieu
*Assistant Examiner* — Haris Sabah
(74) *Attorney, Agent, or Firm* — Fitzpatrick, Cella, Harper & Scinto

(57) ABSTRACT

This invention relates to a host apparatus and an image editing method, which can reflect a user's desired layout design. The host apparatus, which is connected to a printing apparatus capable of placing and printing a plurality of images on a printing medium and transfers image data, lays out the plurality of images in the following way. The direction of a printing medium to be used for printing is specified. Then, the length of the printing medium to be used for printing is specified. Selectable placement orders of the plurality of images are determined, based on the specification, and are displayed on the screen. Finally, a desired placement order is selected from the displayed selectable placement orders.

8 Claims, 11 Drawing Sheets

| | FOREIGN PATENT DOCUMENTS | |
|---|---|---|
| JP | 2001-10153 | 1/2001 |
| JP | 2001010153 * | 1/2001 |
| JP | 2001-313811 | 11/2001 |
| JP | 2001313811 * | 11/2001 |
| WO | WO 02/084582 | 10/2002 |

OTHER PUBLICATIONS

Parsons J., "Planning for Print: ScenicSoft's UpFront" Seybold Report on Publishing Systems, vol. 30, No. 6, Nov. 27, 2000, pp. 1-4, XP002243242.

* cited by examiner

FIG. 7

|  | DEFINED LONG SIDE DIRECTION AS LONGITUDINAL DIRECTION | DEFINED LONG SIDE DIRECTION AS LATERAL DIRECTION |
|---|---|---|
| PAPER SHEET HAVING LONG SIDE WITH FIXED LENGTH |  RIGHTWARD FROM UPPER LEFT<br>OR<br> DOWNWARD FROM UPPER LEFT<br>IS SELECTABLE |  DOWNWARD FROM UPPER LEFT<br>OR<br> RIGHTWARD FROM UPPER LEFT<br>IS SELECTABLE |
| PAPER SHEET HAVING LONG SIDE WITH UNDEFINED LENGTH | ONLY<br> RIGHTWARD FROM UPPER LEFT<br>IS SELECTABLE | ONLY<br> DOWNWARD FROM UPPER LEFT<br>IS SELECTABLE |

SYSTEM AND METHOD FOR DETERMINING PRINT LAYOUT OF IMAGES BASED ON PRINT MEDIUM BEING OF FIXED OR UNDEFINED LENGTH

BACKGROUND OF THE INVENTION

1. Field of the Invention

The present invention relates to a host apparatus and an image editing method. Particularly the present invention relates to a host apparatus which connects an inkjet printing apparatus such as a large-size printer capable of selecting even a roll sheet or cut sheet as output paper, and an image editing method of the host apparatus.

2. Description of the Related Art

A conventional printing system for printing automatically placed images allows the user to select the size of a printing medium (e.g., printing paper sheet) for printout. However, the user cannot select the placement method and must always use the same placement method (e.g., Japanese Patent Publication Laid-Open No. 2001-10153 (see FIG. 4 and page 6)).

In the prior art, the image placement method on output paper is automatically determined in accordance with the type of output paper supported by the user's printing apparatus. It is therefore sometimes impossible to obtain a user's desired layout.

SUMMARY OF THE INVENTION

Accordingly, the present invention is conceived as a response to the above-described disadvantages of the conventional art.

For example, a host apparatus and image editing method according to this invention is capable of reflecting a user's desired layout design.

According to one aspect of the present invention, preferably, there is provided a host apparatus which is connected to a printing apparatus capable of arranging and printing a plurality of images on a printing medium and transfers image data to the printing apparatus, comprising: first specifying means for specifying a direction of a printing medium to be used for printing; second specifying means for specifying a length of the printing medium to be used for printing; decision means for deciding on selectable placement orders of the plurality of images based on specification by the first specifying means and the second specifying means; display means for displaying, on a display screen, the selectable placement orders decided by the decision means; and selection means for selecting a desired placement order from the selectable placement orders displayed by the display means.

According to another aspect of the present invention, preferably, there is provided an image editing method in a host apparatus which is connected to a printing apparatus capable of arranging and printing a plurality of images on a printing medium and transfers image data to the printing apparatus, comprising: a first specifying step of specifying a direction of a printing medium to be used for printing; a second specifying step of specifying a length of the printing medium to be used for printing; a decision step of deciding selectable placement orders of the plurality of images, based on specification in the first specifying step and the second specifying step; a display step of displaying, on a display screen, the selectable placement orders decided in the decision step; and a selection step of selecting a desired placement order from the selectable placement orders displayed in the display step.

According to still another aspect of the present invention, preferably, there is provided a computer program executed by a computer so as to perform each step in the above method.

The invention is particularly advantageous since it allows image placement reflecting the user's desired layout design.

This allows the user to select any output paper type according to the user's preference (e.g., a cut sheet with a fixed length or a roll sheet with an undefined length) and attain automatic placement suitable for each paper type.

Further features of the present invention will become apparent from the following description of exemplary embodiments (with reference to the attached drawings).

BRIEF DESCRIPTION OF THE DRAWINGS

FIG. 7 is a view showing an example of a display window to display determined choices;

DESCRIPTION OF THE EMBODIMENTS

Preferred embodiments of the present invention will now be described in detail in accordance with the accompanying drawings.

In this specification, the terms "print" and "printing" not only include the formation of significant information such as characters and graphics, but also broadly include the formation of images, figures, patterns, and the like on a printing medium, or the processing of the medium, regardless of whether they are significant or insignificant and whether they are so visualized as to be visually perceivable by humans.

Also, the term "printing medium" not only includes a paper sheet used in common printing apparatuses, but also broadly includes materials, such as cloth, a plastic film, a metal plate, glass, ceramics, wood, and leather, capable of accepting ink.

Furthermore, the term "ink". (to be also referred to as a "liquid" hereinafter) should be extensively interpreted similar to the definition of "print" described above. That is, "link" includes a liquid which, when applied onto a printing medium, can form images, figures, patterns, and the like, can process the printing medium, and can process ink (e.g., can solidify or insolubilize a coloring agent contained in ink applied to the printing medium).

Furthermore, unless otherwise stated, the term "nozzle" generally means a set of a discharge orifice, a liquid channel connected to the orifice and an element to generate energy utilized for ink discharge.

<Description of Outline of Printing System and Inkjet Printing Apparatus Main Body (FIGS. 1 and 2)>

Figure 1:
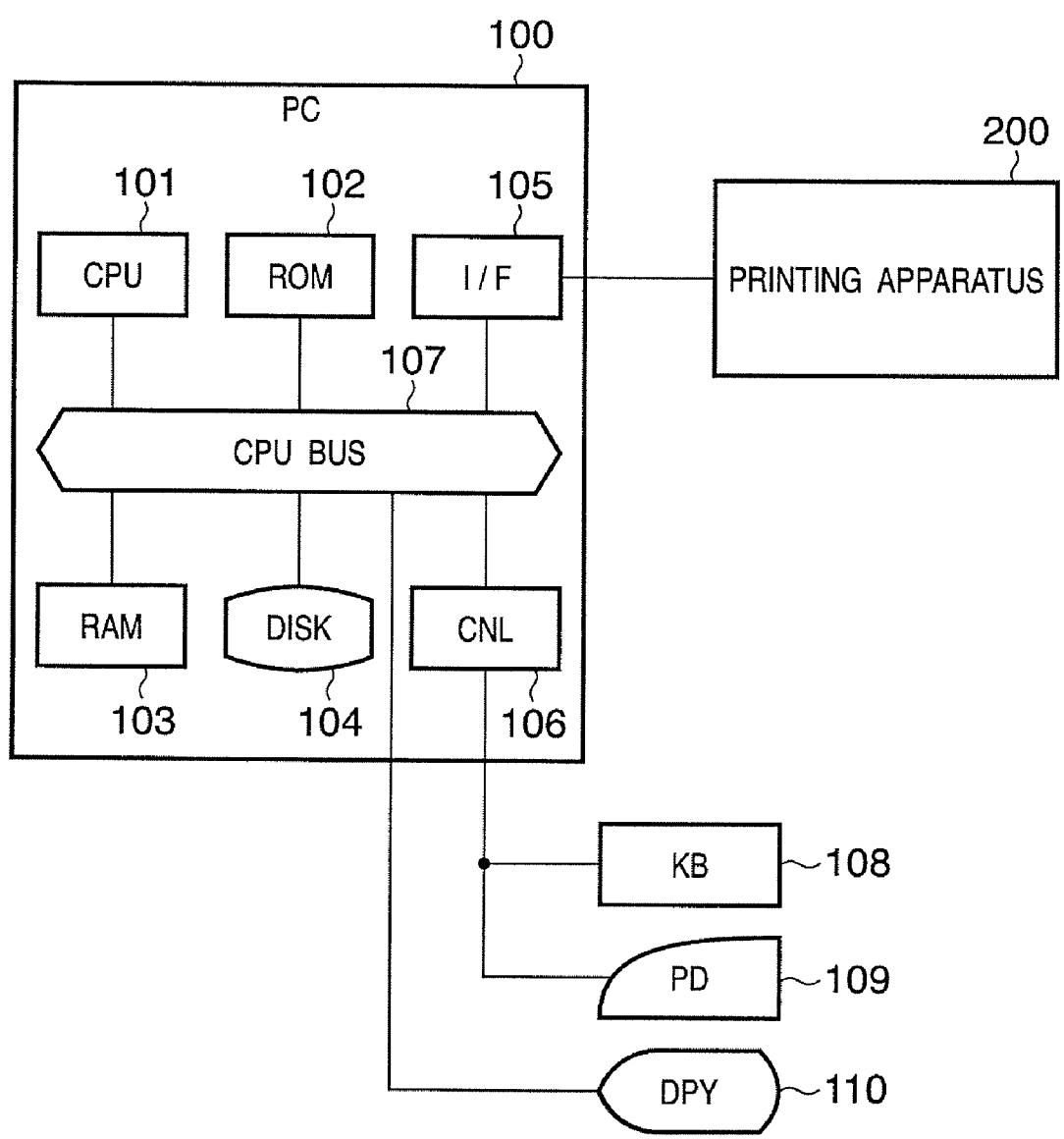
FIG. 1 is a block diagram showing the schematic configuration of a printing system according to a typical embodiment of the present invention.

FIG. 1 is a block diagram showing the schematic configuration of a printing system according to a typical embodiment of the present invention. As shown in FIG. 1, this system includes a personal computer (to be referred to as a PC hereinafter) 100 serving as a host apparatus, and an inkjet printing apparatus 200 for printing using a printing paper sheet of large size such as A0 or B0.

The PC 100 includes a CPU 101 that controls the entire host apparatus, a ROM 102 that stores control programs and constants, and a RAM 103 used by the CPU 101 as a work area to execute the control programs and application programs to be described later. The PC 100 also includes a hard disk (DISK) 104 that stores a large amount of information and various kinds of application programs (to be referred to as applications hereinafter), and an interface (I/F) 105 to the printing apparatus 200. The PC 100 transmits/receives data to/from the printing apparatus 200 via the interface 105.

The PC 100 connects to a keyboard (KB) 108 and a pointing device (PD) 109 via a device controller (CNL) 106. A display (DPY) 110 such as an LCD is connected to the PC 100.

The keyboard (KB) 108, pointing device (PD) 109, and display (DPY) 110 form a man-machine interface so that the user can communicate with the PC 100.

Figure 2:
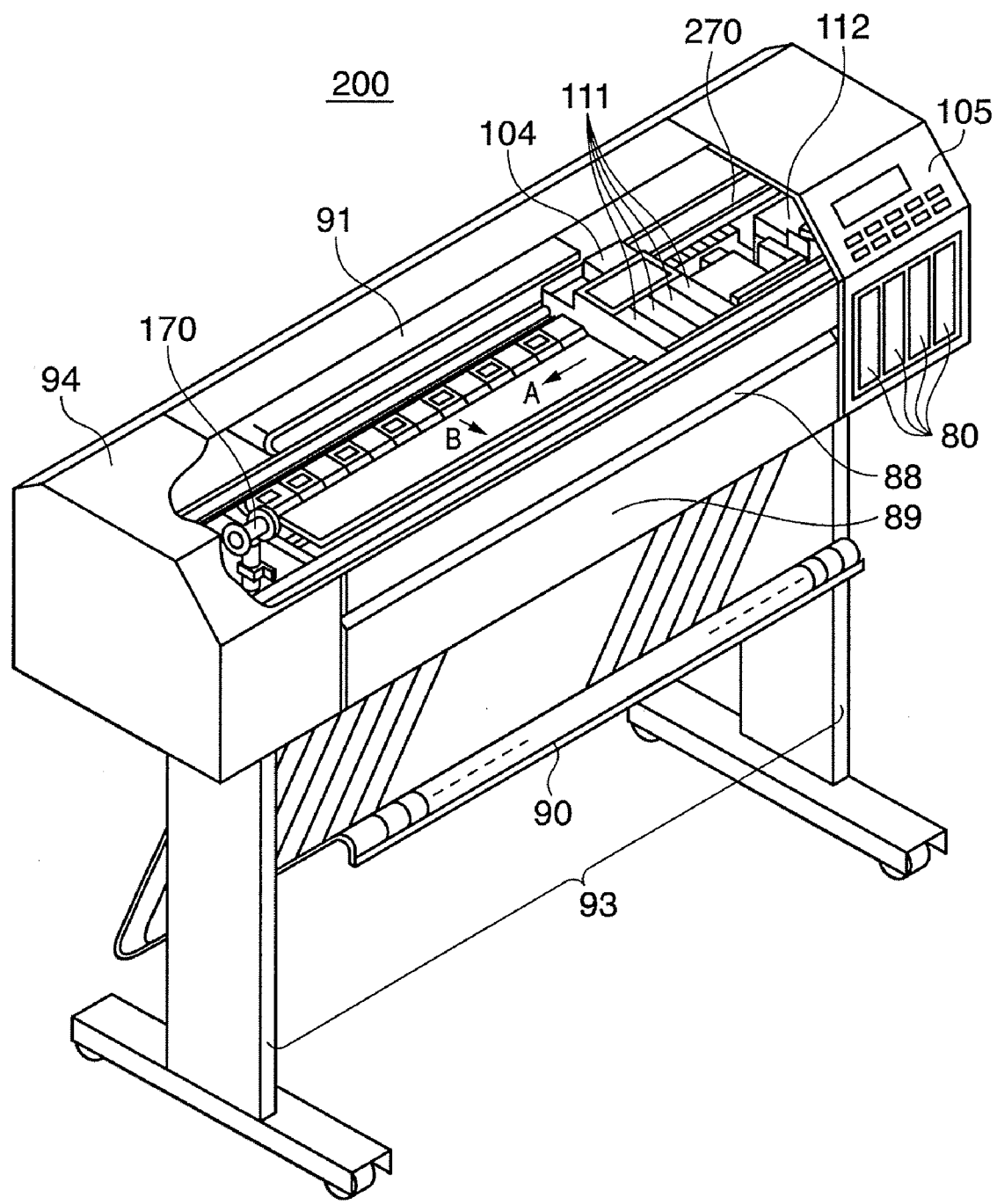
FIG. 2 is a perspective view showing the outer appearance of an inkjet printing apparatus 200.

FIG. 2 is a perspective view showing the outer appearance of the inkjet printing apparatus (to be referred to as a printing apparatus hereinafter) 200. FIG. 2 shows the apparatus without the upper cover.

As shown in FIG. 2, the printing apparatus 200 has a manual feed port 88 on the front surface. A roll sheet cassette 89 that can open to the front is provided under the manual feed port 88. The user can insert a cut sheet with a predefined length to the manual feed port 88. A printing medium such as a printing paper sheet (to be referred to as a printing medium hereinafter) is supplied from the manual feed port 88 or roll sheet cassette 89 into the printing apparatus. The printing apparatus comprises an apparatus main body 94 supported by two legs 93, a stacker 90 to hold discharged printing media, and a transparent see-through upper cover 91 that can open. The apparatus main body 94 has an operation panel 105, ink supply unit, and ink tank on its right side.

As shown in FIG. 2, the printing apparatus 200 has a conveyance roller 170 to convey a printing medium such as a printing paper sheet in the direction of arrow B (sub-scanning direction). The printing apparatus 200 also has a carriage unit (to be referred to as a carriage hereinafter) 104 which is supported and guided to be reciprocally movable in the widthwise direction (direction of arrow A, i.e., main scanning direction) of the printing medium. The printing apparatus 200 also has a carriage motor (not shown) and a carriage belt (to be referred to as a belt hereinafter) 270 to reciprocally move the carriage 104 in the direction of arrow A. An inkjet printhead (to be referred to as a printhead hereinafter) 111 is mounted on the carriage 104. The printing apparatus 200 also comprises an ink tank 80 that supplies ink to the printhead 111, and a suction ink recovery unit 112 to solve ink discharge failure caused by, e.g., clogging in the orifices of the printhead.

In this printing apparatus, the carriage 104 has the printhead 111 with four heads corresponding to four color inks so as to perform color printing on a printing medium. More specifically, the printhead 111 includes, e.g., a K head to discharge K (black) ink, C head to discharge C (cyan) ink, M head to discharge M (magenta) ink, and Y head to discharge Y (yellow) ink.

To print on a printing medium, the conveyance roller 170 conveys the printing medium to a predetermined print start position. Then, an operation of causing the carriage 104 to scan the printhead 111 in the main scanning direction and an operation of causing the conveyance roller 170 to convey the printing medium in the sub-scanning direction are repeated.

More specifically, the belt 270 and carriage motor (not shown) move the carriage 104 in the direction of arrow A in FIG. 2 to perform printing on the printing medium. When the carriage 104 returns to the position (home position) where the carriage was situated before the start of scanning, the conveyance roller conveys the printing medium in the sub-scanning direction (direction of arrow B in FIG. 2). The carriage scans in the direction of arrow A in FIG. 2 again, thereby printing images and texts on the printing medium. The above-described operations are repeated to complete printing on one sheet of printing medium. Then, the printing medium is discharged to the stacker 90, thereby completing printing on one paper sheet.

As described above, the printing apparatus can print an image by using a printing paper sheet of large size such as A0 or B0. It is therefore possible to lay out and print a plurality of images on a single printing paper sheet.

Figure 3:
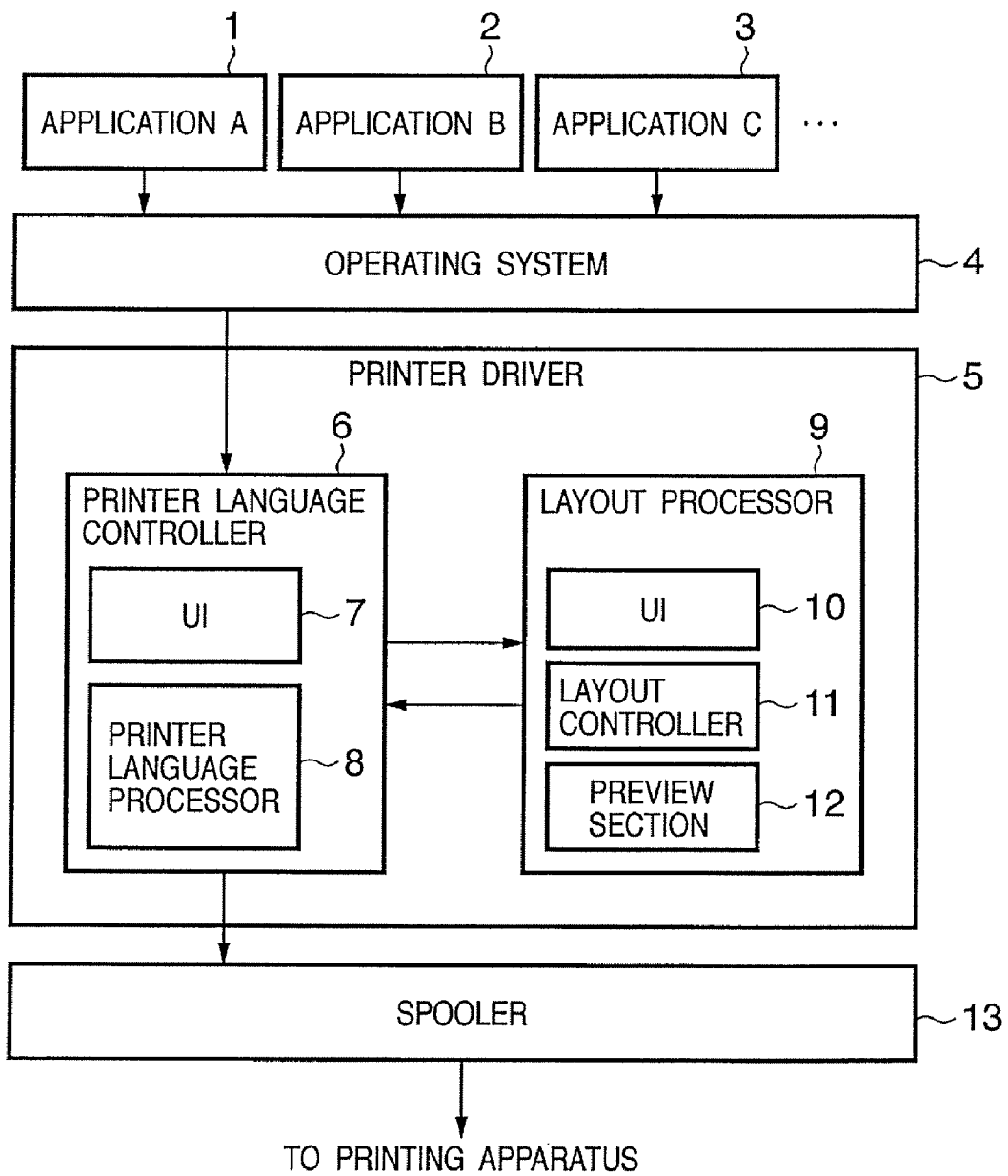
FIG. 3 is a block diagram showing the functional arrangement of software executed by a PC 100.

FIG. 3 is a block diagram showing the functional arrangement of software executed by the PC 100.

In the PC 100, applications A 1, B 2, and C 3 run under an operating system 4 such as Windows®. Print data output from the applications is transferred to a printer driver 5.

The printer driver 5 includes a printer language controller 6 and a layout processor 9. The printer language controller 6 is divided into a UI (user interface) 7 and a printer language processor 8. The layout processor 9 is divided into a UI (user interface) 10, layout controller 11, and preview section 12.

Print data transferred to the printer driver 5 is temporarily transferred from the printer language controller 6 to the layout processor 9 and, after a layout process, returned to the printer language controller 6. The print data returned to the printer language controller 6 is translated into a printer language by the printer language processor 8 and sent to a spooler 13. If the layout process is unnecessary, the print data is immediately translated into a printer language by the printer language processor 8 in the printer language controller 6 and sent to the spooler 13. Switching of these operations is implemented by settings in the UI (user interface) 7.

Figure 4:
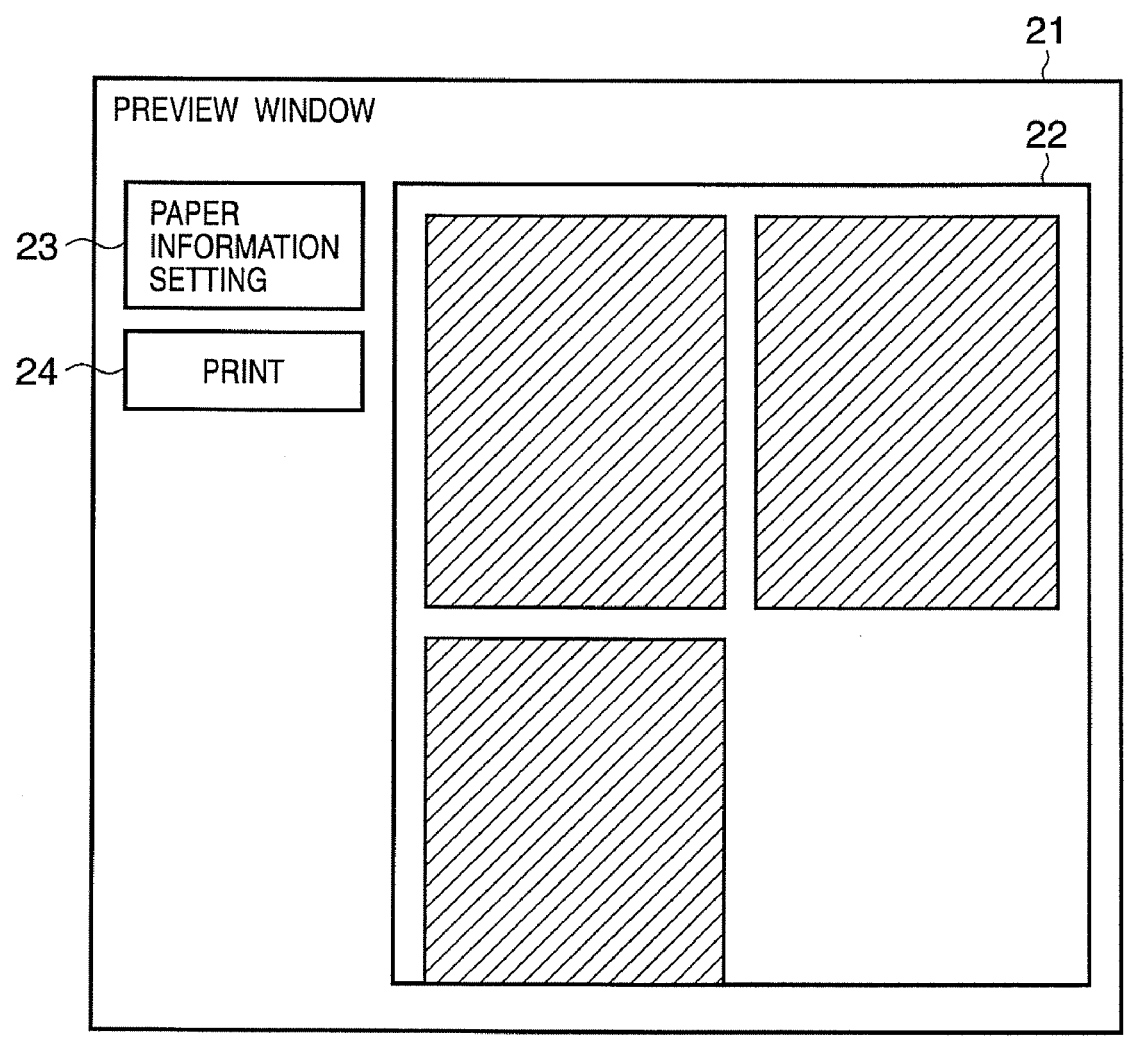
FIG. 4 is a view showing an entire preview window displayed on the preview section of a layout processor.

FIG. 4 is a view showing an entire preview window 21 displayed on the preview section 12 of the layout processor 9. Actually, the display (DPY) 110 of the PC 100 displays the preview window.

As shown in FIG. 4, the user can confirm, in a layout preview window 22, the layout state of images based on print data generated by the application A 1, B 2, or C 3 before printing. If the user wishes to change the layout conditions, she/he clicks on a paper information setting button 23 by manipulating the keyboard (KB) 108 or pointing device (PD) 109 to display a paper information setting window 31. The print data that is laid out is transmitted to the spooler 13 when a print button 24 is clicked. Before that, the user can redo the layout any number of times. In the example shown in FIG. 4, three images are displayed in the layout preview window 22. The print button 24 also has a function of determining the layout design.

Figure 5:
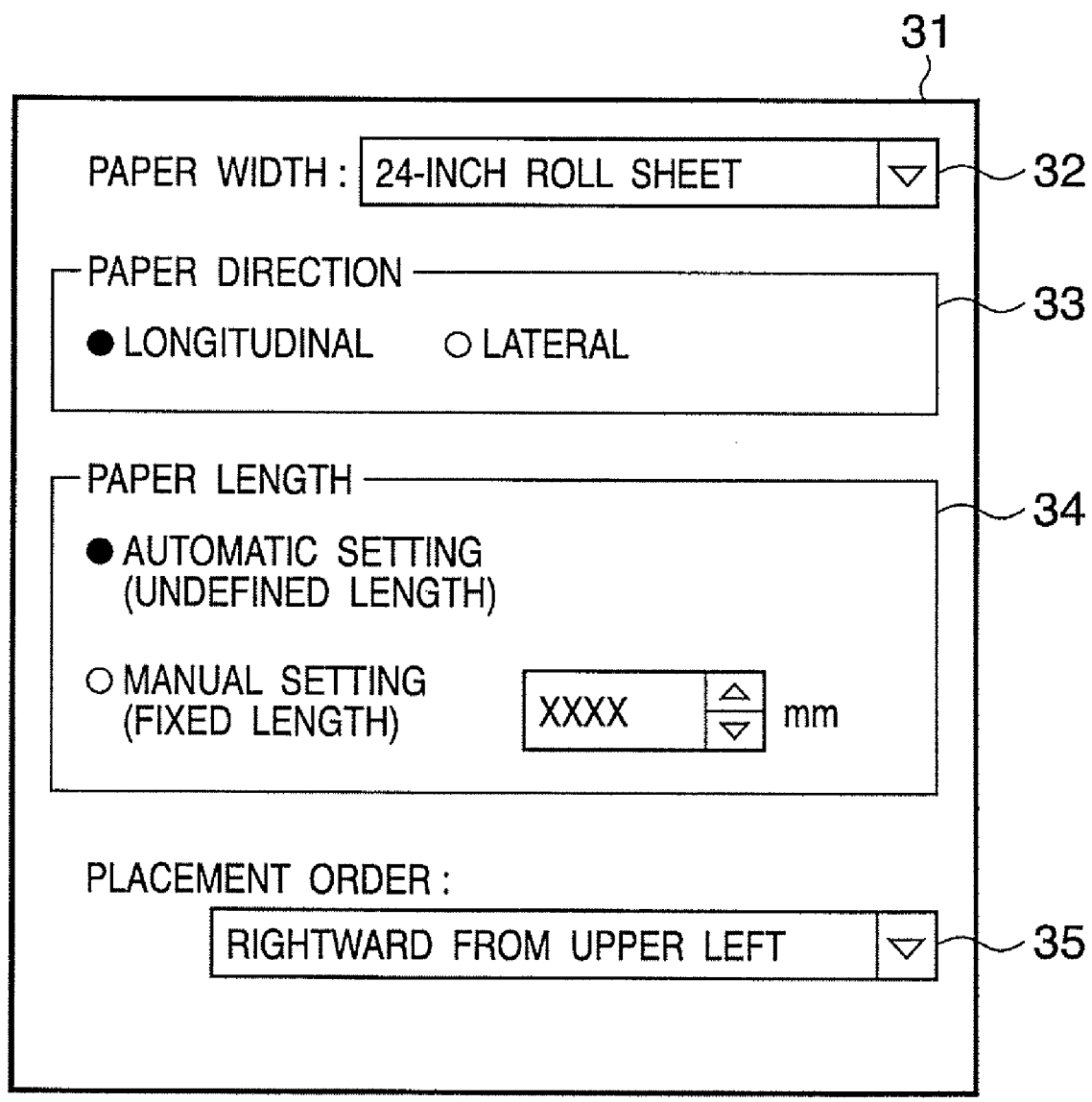
FIG. 5 is a view showing a paper information setting window.

FIG. 5 is a view showing the paper information setting window 31.

The user can change various conditions regarding a layout by using this window and the man-machine interface.

As shown in FIG. 5, the user can specify the width of output paper to be used for layout in a paper width setting window 32. The paper width setting has no direct influence on the placement order of layout. The user can specify the direction of paper to be used for layout in a paper direction setting window 33. In this embodiment, the user can select a longitudinal direction or lateral direction to define the long side direction of paper. In a paper length setting window 34, the user can select paper having a long side with a fixed length or paper having a long side with an undefined length. "Automatic setting" is displayed as a setting for the undefined length, and "manual setting" is displayed as a setting for the fixed length. The same effect can be obtained by displaying "roll sheet" as a setting for the undefined length and "cut sheet" as a setting for the fixed length. The user can select a placement order in a placement order setting window 35. The paper direction setting window 33 and paper length setting window 34 determine the choices displayed in the placement order setting window 35.

A procedure up to determination of automatic placement will be described next in detail.

Figure 6:
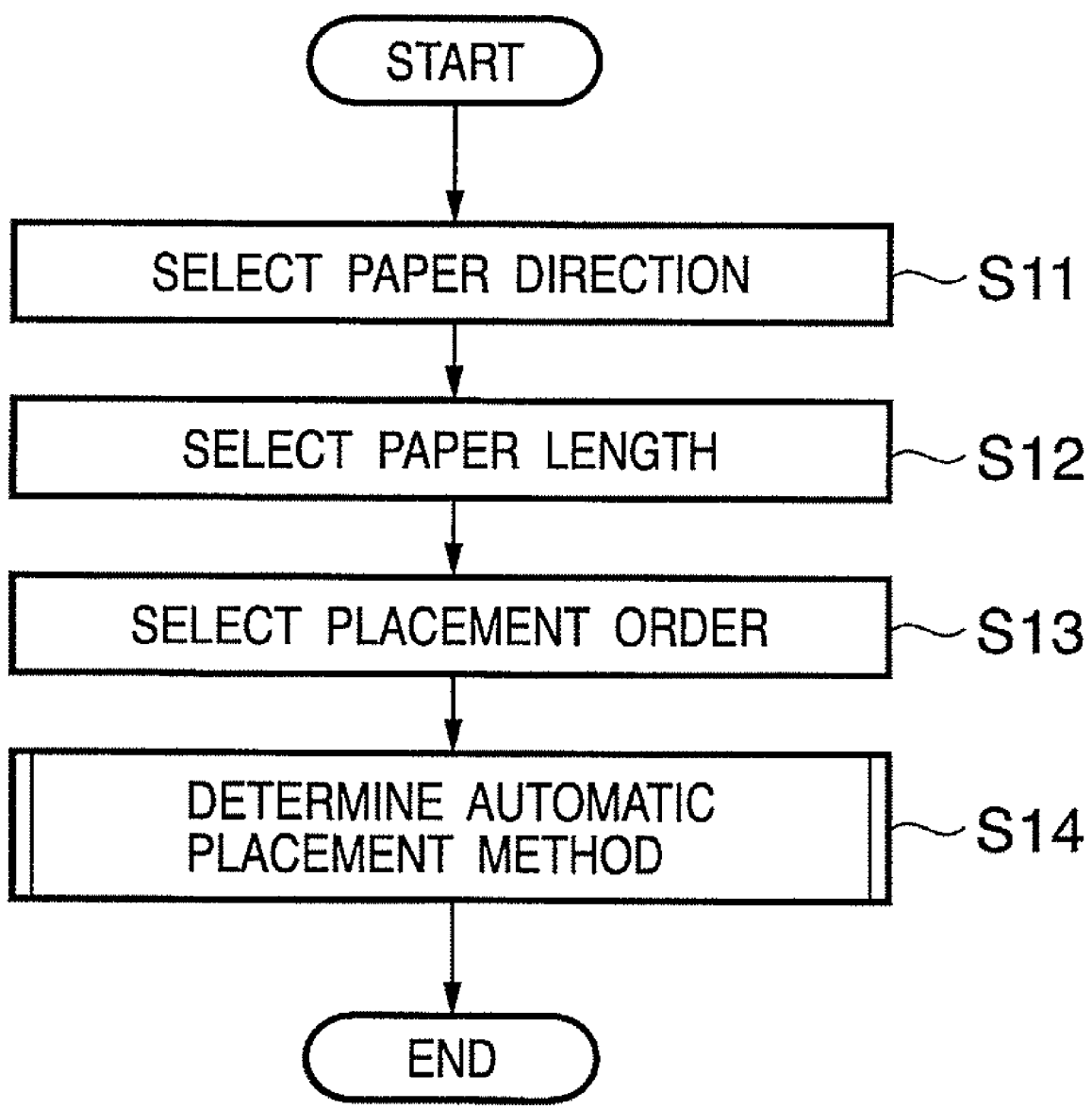
FIG. 6 is a flowchart showing a procedure up to determination of automatic placement.

FIG. 6 is a flowchart showing the procedure up to determination of automatic placement.

The user causes the display (DPY) 110 to display the paper direction setting window 33 and defines the long side direction of paper as either the longitudinal direction or lateral direction (step S11). Next, the user causes the display (DPY) 110 to display the paper length setting window 34 and selects either paper having a long side with a fixed length or paper having a long side with an undefined length (step S12). With this procedure, the choices to be displayed in the placement order setting window 35 are determined.

The choices of the placement order are displayed in the window (step S13).

FIG. 7 is a view showing an example of a display window to display the determined choices.

As shown in FIG. 7, if paper having a long side with a fixed length is used while defining the long side direction as the longitudinal direction, the placement order setting window 35 displays two choices: "rightward from the upper left (default)" and "downward from the upper left". If paper having a long side with a fixed length is used while defining the long side direction as the lateral direction, the placement order setting window 35 displays two choices: "downward from the upper left (default)" and "rightward from the upper left". If paper having a long side with an undefined length is used while defining the long side direction as the longitudinal direction, the placement order setting window 35 displays only "rightward from the upper left". If paper having a long side with an undefined length is used while defining the long side direction as the lateral direction, the placement order setting window 35 displays only "downward from the upper left".

The user selects and determines a desired automatic placement order from the displayed choices by referring to the placement order setting window 35 (step S14).

The PC 100 edits the plurality of image data with the thus determined placement order so that they are printed in the determined placement order and transfers the images to the printing apparatus 200. The printing apparatus 200 receives the transferred image data and prints the plurality of images.

The method of arranging images based on an actually determined automatic placement order will be described below in detail with reference to FIGS. 8 to 1.

In FIGS. 8 to 11, bold solid lines indicate printing paper sheets, thin solid lines indicate images laid out, and numbers added in regions surrounded by the thin solid lines indicate the placement orders of the images.

Figure 8:
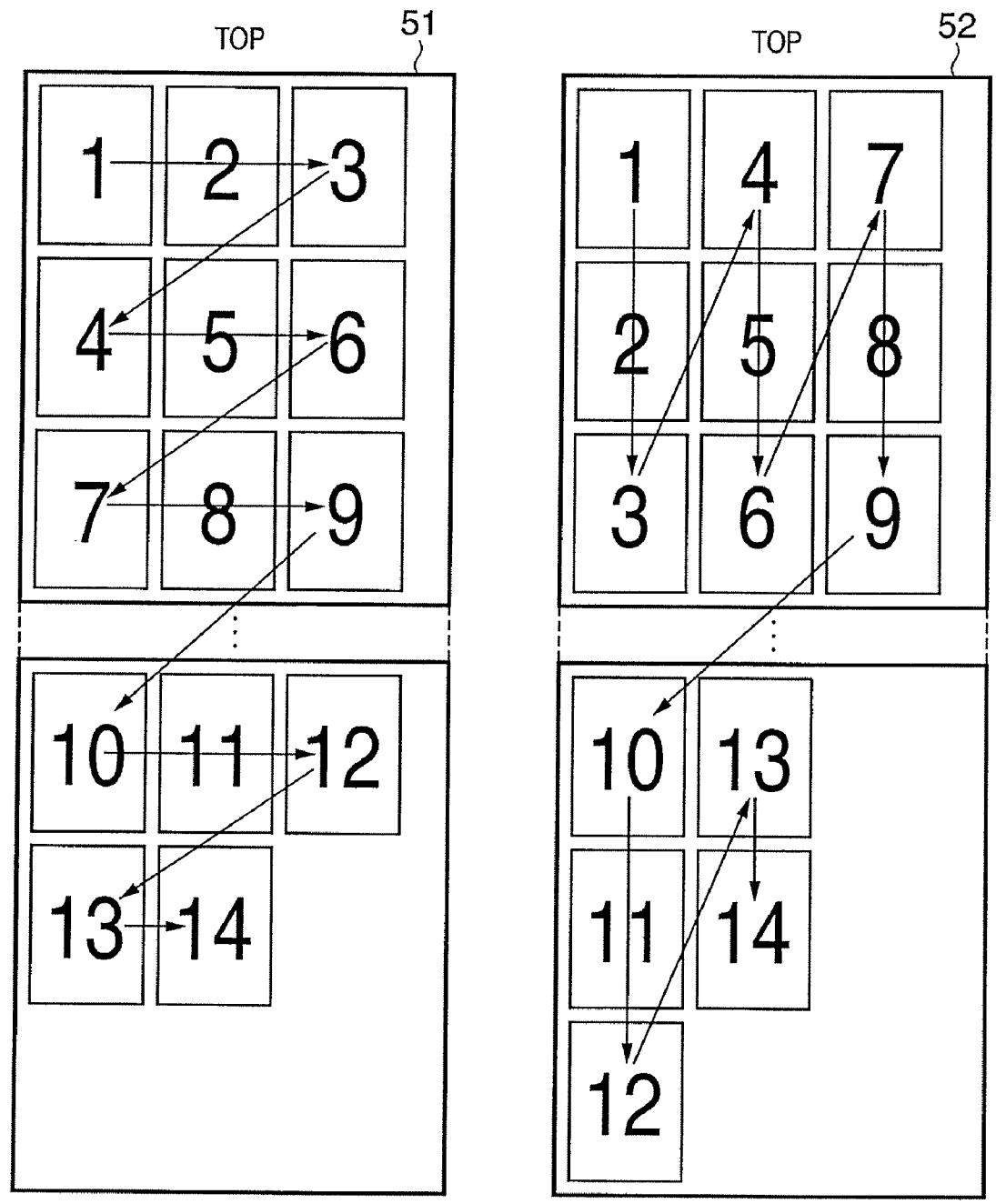
FIG. 8 is a view showing placement orders in a case where the user selects "a long side direction of paper is defined as a longitudinal direction" in a paper direction setting window and "paper having a long side with a fixed length" in a paper length setting window.

FIG. 8 is a view showing placement orders in a case where the user selects "a long side direction of paper is defined as a longitudinal direction" in the paper direction setting window 33 and "paper having a long side with a fixed length" in the paper length setting window 34.

The example shown in FIG. 8 represents an automatic placement result 51 obtained when the user selects "rightward from the upper left" in the placement order setting window 35, and an automatic placement result 52 obtained when the user selects "downward from the upper left" in the placement order setting window 35.

Figure 9:
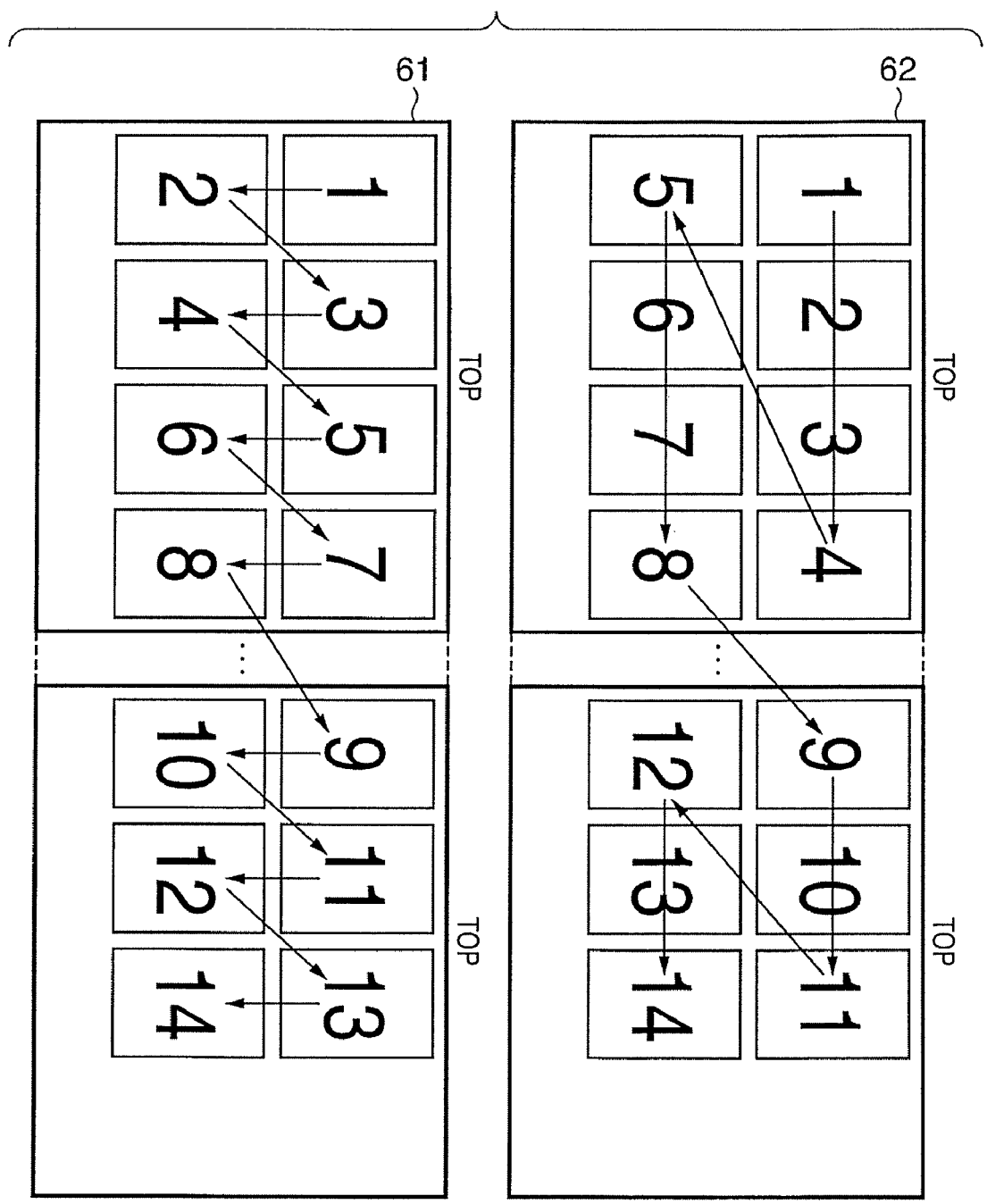
FIG. 9 is a view showing placement orders in a case where the user selects "a long side direction of paper is defined as a lateral direction" in the paper direction setting window and "paper having a long side with a fixed length" in the paper length setting window.

FIG. 9 is a view showing placement orders in a case where the user selects "a long side direction of paper is defined as a lateral direction" in the paper direction setting window 33 and "paper having a long side with a fixed length" in the paper length setting window 34.

The example shown in FIG. 9 represents an automatic placement result 61 obtained when the user selects "downward from the upper left" in the placement order setting window 35, and an automatic placement result 62 obtained when the user selects "rightward from the upper left" in the placement order setting window 35.

Figure 10:
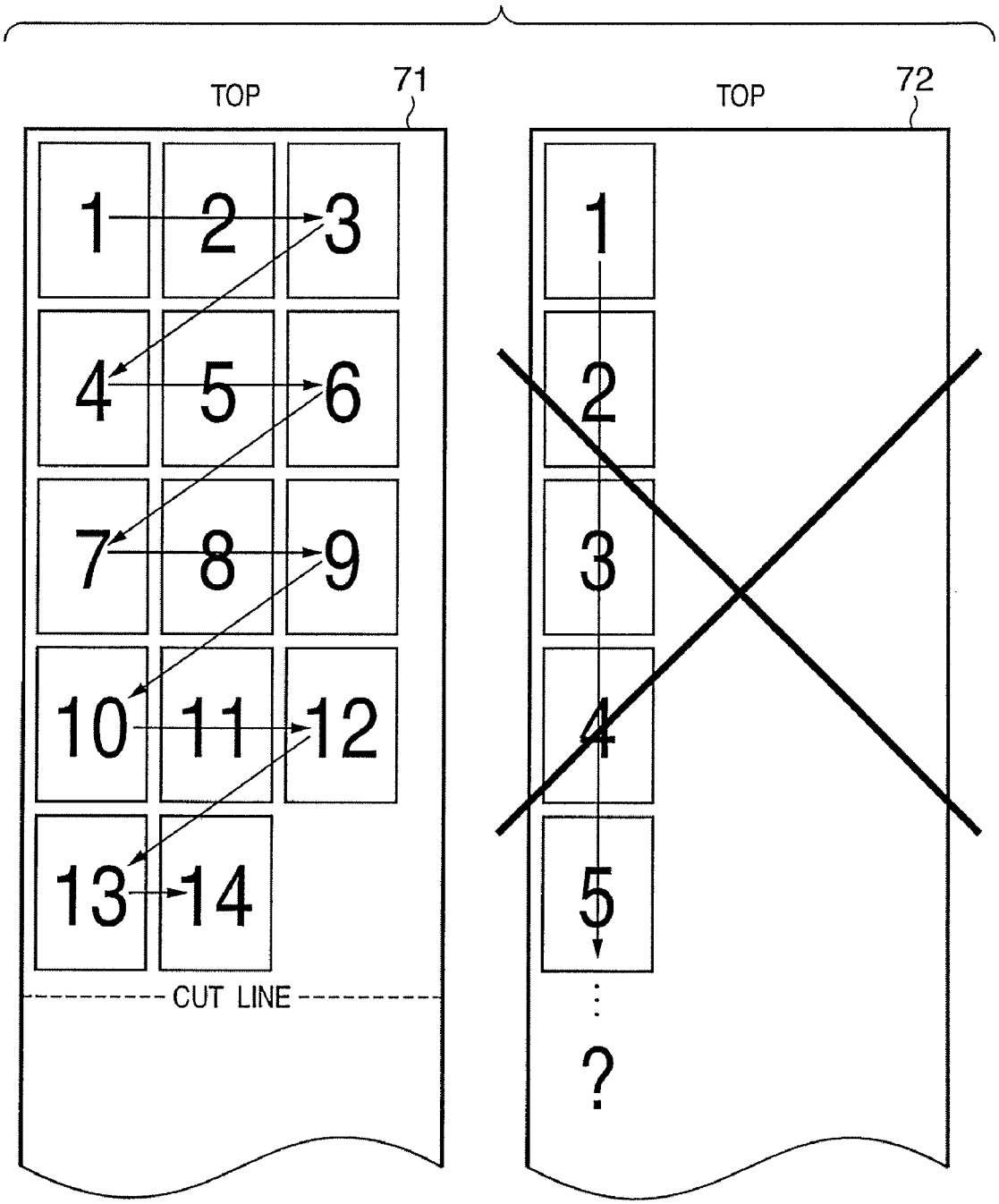
FIG. 10 is a view showing placement orders in a case where the user selects "a long side direction of paper is defined as a longitudinal direction" in the paper direction setting window and "paper having a long side with an undefined length" in the paper length setting window.

FIG. 10 is a view showing placement orders in a case where the user selects "a long side direction of paper is defined as a longitudinal direction" in the paper direction setting window 33 and "paper having a long side with an undefined length" in the paper length setting window 34.

The example shown in FIG. 10 represents an automatic placement result 71 obtained when the user selects "rightward from the upper left" in the placement order setting window 35. Reference numeral 72 in FIG. 10 denotes a provisional automatic placement result showing a placement order obtained if the user selects a placement order corresponding to "downward from the upper left", which is not displayed in the placement order setting window 35 when the user selects "paper having a long side with an undefined length". The reason why the placement order corresponding to "downward from the upper left" is not displayed in the placement order setting window 35 can be seen from the provisional automatic placement result 72 with "x". That is, the provisional automatic placement result 72 indicates a placement for "paper having a long side with an undefined length" Hence, the returning point of the image placement position is undefined, and the images are aligned in one line. This is inappropriate as automatic placement. Hence, in this embodiment, when the user selects "a long side direction of paper is defined as a longitudinal direction" and "paper having a long side with an undefined length", the placement order corresponding to "downward from the upper left" is not displayed in the placement order setting window 35. That is, the display is suppressed.

Figure 11:
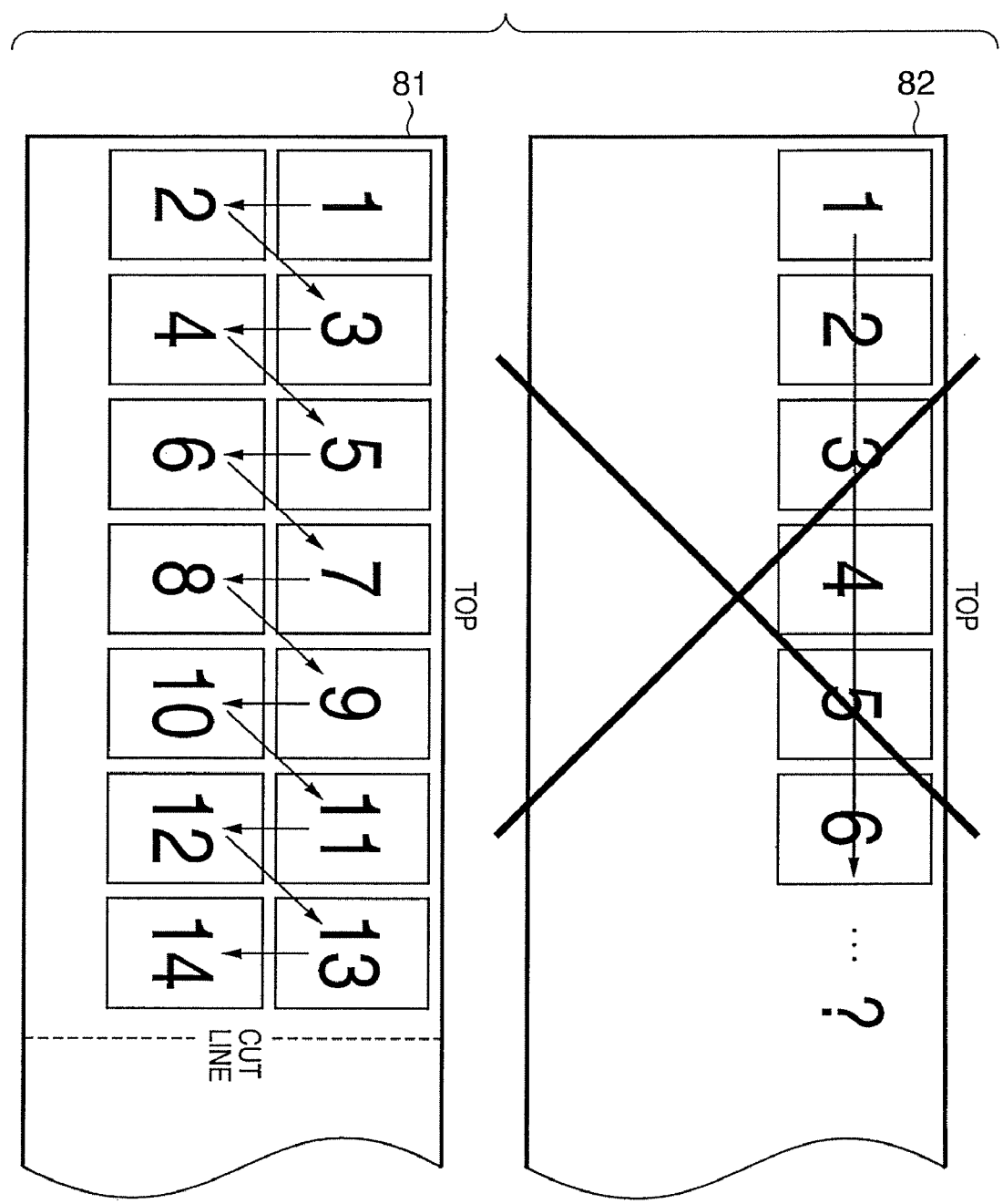
FIG. 11 is a view showing placement orders in a case where the user selects "a long side direction of paper is defined as a lateral direction" in the paper direction setting window and "paper having a long side with an undefined length" in the paper length setting window.

FIG. 11 is a view showing placement orders in a case where the user selects "a long side direction of paper is defined as a lateral direction" in the paper direction setting window 33 and "paper having a long side with an undefined length" in the paper length setting window 34.

The example shown in FIG. 11 represents an automatic placement result 81 obtained when the user selects "downward from the upper left" in the placement order setting window 35. Reference numeral 82 in FIG. 11 denotes a provisional automatic placement result showing a placement order obtained if the user selects a placement order corresponding to "rightward from the upper left", which is not displayed in the placement order setting window 35 when the user selects "paper having a long side with an undefined length". The reason why the placement order corresponding to "rightward from the upper left" is not displayed in the placement order setting window 35 can be seen from the provisional automatic placement result 82 with "x". That is, the provisional automatic placement result 82 indicates a placement for "paper having a long side with an undefined length". Hence, the returning point of the image placement position is undefined, and the images are aligned in one line. This is inappropriate as automatic placement. Hence, in this embodiment, when the user selects "a long side direction of paper is defined as a lateral direction" and "paper having a long side with an undefined length", the placement order corresponding to "rightward from the upper left" is not displayed in the placement order setting window 35. That is, the display is suppressed.

According to the above-described embodiment, the user can lay out images by selecting a desired placement order from choices of image placement order definitely displayed in accordance with the settings in the paper direction setting window and paper length setting window.

This makes it possible to reflect the user's intention to the image placement order in a case where a plurality of images are to be printed on a printing paper sheet of large size such as A0 or B0.

In the above-described embodiment, droplets discharged from the printhead are ink droplets, and the liquid stored in the ink tank is ink. However, the liquid stored is not limited to ink. For example, a kind of process liquid which is discharged to a printing medium to increase the fixing effect and water repellency of a printed image or increase the image quality may be stored in the ink tank.

In the above-described embodiment, particularly when, of inkjet printing systems, a system which comprises means (e.g., an electrothermal transducer) for generating heat energy for ink discharge and changes the ink state by the heat energy is used, the printing density and resolution can be increased.

In the above-described embodiment, a serial scan type inkjet printing apparatus has been exemplified. However, the present invention is not limited to this and can also effectively be applied to an inkjet printing apparatus using a full line type printhead having a length corresponding to the maximum width of a printing medium printable by the apparatus. Such a printhead may meet this length by combining a plurality of printheads or by being a single integrated printhead structure.

The inkjet printing apparatus of the present invention is used as an image output device of an information processing equipment such as a computer. The printing apparatus can also take the form of a copying apparatus combined with a reader, or a facsimile apparatus having a transmission/reception function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-38480, filed Feb. 15, 2006, which is hereby incorporated by reference herein in its entirety.

What is claimed is:

1. A host apparatus which is connected to a printing apparatus capable of arranging and printing a plurality of images on a printing medium and transfers image data to the printing apparatus, comprising:
   first specifying means for specifying a direction of a printing medium to be used for printing;
   second specifying means for specifying a long side length, of the printing medium to be used for printing, to be treated as either a fixed length or an undefined length, wherein (1) in a case where the printing medium set in the printing apparatus is a cut-type printing medium, the long side length of the printing medium is treated as a fixed length, and (2) in a case where the printing medium set in the printing apparatus is a roll-type printing medium, the long side length of the printing medium is treated as an undefined length or the long side length of the printing medium is treated as a fixed length if the long side length of the printing medium is specified by a user;
   decision means for deciding selectable placement orders of the plurality of images and a number of the selectable placement orders, based on specification by said first specifying means and said second specifying means;
   display means for displaying, on a display screen, the selectable placement orders decided by said decision means; and
   selection means for selecting a desired placement order from the selectable placement orders displayed by said display means,
   wherein, in a case where the printing medium is a roll-type printing medium, said decision means changes the number of selectable placement orders in accordance with a result of whether the long side length of the printing medium is treated as an undefined length or a fixed length.

2. The apparatus according to claim 1, wherein said first specifying means specifies that a long side direction of the printing medium is defined as either a longitudinal direction or a lateral direction.

3. The apparatus according to claim 1, further comprising determination means for determining the placement order selected by said selection means.

4. The apparatus according to claim 3, further comprising transmission means for transmitting the image data to the printing apparatus after determination by said determination means.

5. The apparatus according to claim 1, wherein the printing apparatus is capable of using a large-size printing medium.

6. An image editing method in a host apparatus which is connected to a printing apparatus capable of arranging and printing a plurality of images on a printing medium and transfers image data to the printing apparatus, comprising:
   a first specifying step of specifying a direction of a printing medium to be used for printing;
   a second specifying step of specifying a long side length, of the printing medium to be used for printing, to be treated as either a fixed length or an undefined length, wherein (1) in a case where the printing medium set in the printing apparatus is a cut-type printing medium, the long side length of the printing medium is treated as a fixed length, and (2) in a case where the printing medium set in the printing apparatus is a roll-type printing medium, the long side length of the printing medium is treated as an undefined length or the long side length of the printing medium is treated as a fixed length if the long side length of the printing medium is specified by a user;

a decision step of deciding selectable placement orders of the plurality of images and a number of the selectable placement orders, based on specification in the first specifying step and the second specifying step;

a display step of displaying, on a display screen, the selectable placement orders decided in the decision step; and a selection step of selecting a desired placement order from the selectable placement orders displayed in the display step, wherein, in a case where the printing medium is a roll-type printing medium, the decision step changes the number of selectable placement orders in accordance with a result of whether the long side length of the printing medium is treated as an undefined length or a fixed length.

7. A host apparatus which is connected to a printing apparatus capable of arranging and printing a plurality of images on a roll-type printing medium and transfers image data to the printing apparatus, comprising:

specifying means for specifying that the printing medium is treated as either a printing medium having a long side with a fixed length or a printing medium having a long side with an undefined length, wherein the long side length of the printing medium is treated as a fixed length if the long side length of the printing medium is specified by a user;

decision means for deciding selectable placement orders of the plurality of images and a number of the selectable placement orders, based on specification by said specifying means;

display means for displaying, on a display screen, the selectable placement orders decided by said decision means; and selection means for selecting a desired placement order from the selectable placement orders displayed by said display means, wherein said decision means changes the number of the selectable placement orders in accordance with a result of whether the printing medium is treated as a printing medium having a long side with an undefined length or a printing medium having a long side with a fixed length.

8. An image editing method in a host apparatus which is connected to a printing apparatus capable of placing and printing a plurality of images on a roll-type printing medium and transfers image data to the printing apparatus, comprising the steps of:

specifying that the printing medium is treated as either a printing medium having a long side with a fixed length or a printing medium having a long side with an undefined length, wherein the long side length of the printing medium is treated as a fixed length if the long side length of the printing medium is specified by a user;

deciding selectable placement orders of the plurality of images and a number of the selectable placement orders, based on specification in the specifying step;

displaying, on a display screen, the selectable placement orders decided in the deciding step; and selecting a desired placement order from the selectable placement orders displayed in the display step, wherein the number of the selectable placement orders are changed in the deciding step in accordance with the result of the printing medium is treated as a printing medium having a long side with an undefined length or a printing medium having a long side with a fixed length.

* * * * *